Dec. 8, 1931.  P. CUNNEEN  1,835,638
HACK SAW
Filed June 20, 1930  2 Sheets-Sheet 2
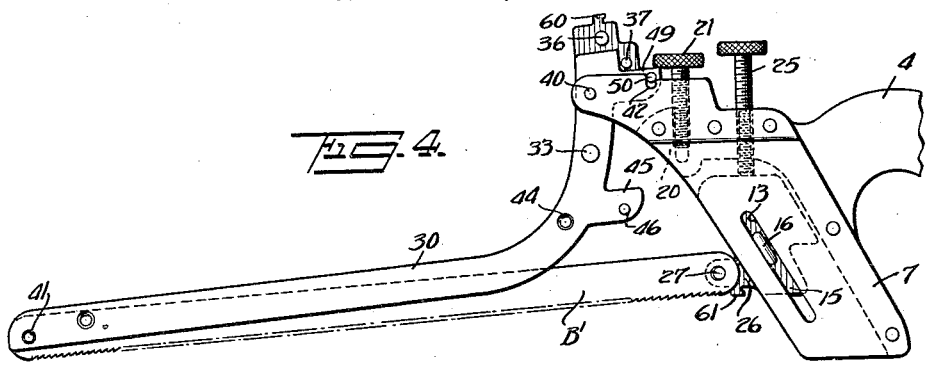
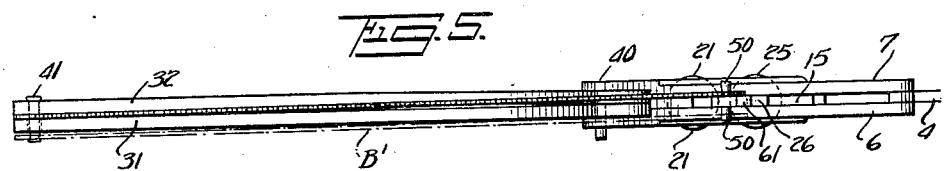
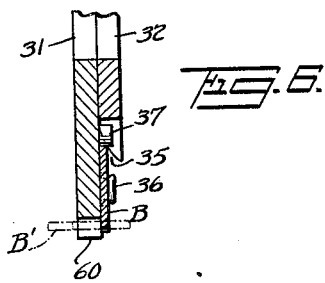
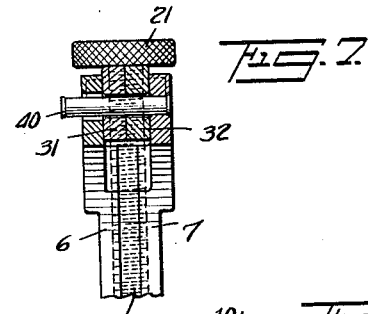
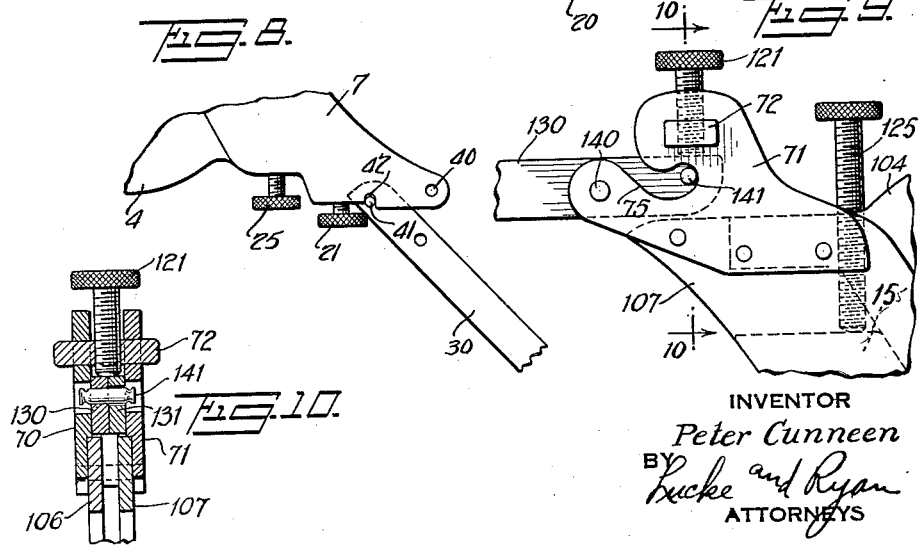
INVENTOR
Peter Cunneen
BY
Lucke and Ryan
ATTORNEYS Patented Dec. 8, 1931

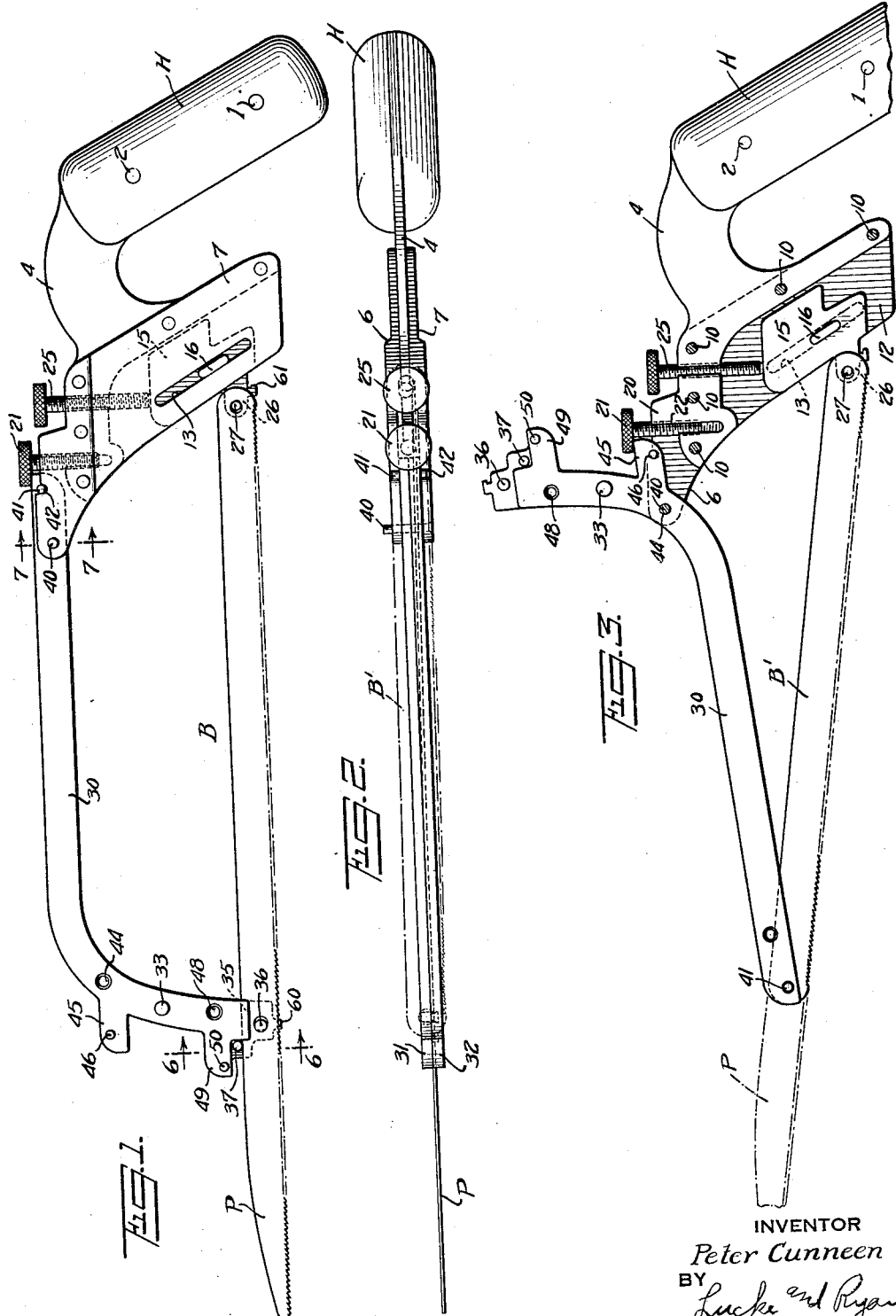

1,835,638

UNITED STATES PATENT OFFICE

PETER CUNNEEN OF NEW ROCHELLE, NEW YORK

HACK SAW

Application filed June 20, 1930. Serial No. 462,448.

This invention relates to a hack saw, and especially to a hack saw of that type which is adapted to be adjusted for a variety of spacings between the hack saw frame and the blade to accommodate different kinds of work.

An object of the invention is to provide a hack saw made up of steel stampings as distinguished from cast parts.

Another object is to provide a saw with a main frame and a reversible back frame possessing more than two adjustable positions relative to the main frame so that the saw blade may be spaced from the back frame to accommodate any type of work.

Still another object is to provide means for preventing the back frame from disengaging itself from the main frame when the hack saw blade is moved up or down and the pivot pin connecting the main frame and back saw frame has been removed or fallen out of its pivot or engaging position.

Another object is to provide a hack saw blade, one end of which projects beyond the hack saw frame and is preferably slightly tapered so that this part of the saw blade may be inserted in very small holes or narrow apertures where the saw frame itself would not fit.

A further object is to provide novel supporting means for the front end of such a saw blade so as to furnish the maximum strength and rigidity to the projecting end thereof.

Still a further object is to furnish two separate adjusting means for the saw blade when in position so that the cutting teeth of the saw blade may be spaced any desired distance (within certain limitations) from the back frame, and at the same time, the proper tension may be maintained on the blade as is the usual practice with hack saw frames. This feature is very desirable when the operator of the saw wishes to limit the depth of cut to a certain maximum distance.

A novel means is provided for supporting one of the adjusting screws which are utilized for accomplishing the last mentioned object so that the eccentric load imposed thereon will not cause the screw to bend.

And still another object of this invention is to provide a novel means for supporting the saw blade in various positions on the saw frame; for instance, pins are provided to support the saw blade on one side of the frame rather than centrally thereof. This will make it convenient for the operator of the saw to perform what is known as "flush" cutting. Pins are also provided to mount the saw blade in a plane at right angles to the plane in which the blade is usually disposed. This will enable certain kinds of work to be more conveniently performed than if the blade were in its conventional position.

Further features and objects of this invention will be more fully understood from the following detail description of the accompanying drawings, in which Fig. 1 is a side elevation of a hack saw illustrating the projecting type of hack saw blade and showing the back frame mounted in relationship to the main frame in a manner to have the maximum spacing between the back frame and saw blade;

Fig. 2 is a top plan view of the device illustrated in Fig. 1;

Fig. 3 is a side elevation partly in section illustrating the back frame in an intermediate reversed position showing a reduced spacing between the back frame and saw blade.

Fig. 4 is a side elevation of the device illustrating the back frame in a position wherein there is the minimum distance between the back frame and saw blade.

Fig. 5 is a bottom plan view of the device illustrating a hack saw blade mounted on the side of the frame for so-called "flush" cutting.

Fig. 6 is a section taken through 6—6 of Fig. 1.

Fig. 7 is a section taken through 7—7 of Fig. 1.

Fig. 8 is a fragmentary view of the device in a reversed position illustrating the means which is utilized to provide the disengagement of the hack saw blade from the main frame when the hack saw blade is not in position and the pivot pin for these two elements has become disengaged.

Fig. 9 is a fragmentary side elevation of another embodiment of this invention.

Fig. 10 is a section taken through 10—10 of Fig. 9.

Looking at the drawings and especially at Fig. 1, H represents the handle which may conveniently be made of two parts riveted to the main frame by rivets 1 and 2. The main frame comprises three plates riveted together. The central or main plate is illustrated at 4 and serves at one end to support the members of the handle H, and at the other end thereof has two auxiliary plates riveted thereto, one on each side of the main plate 4. These auxiliary plates are shown at 6 and 7.

The three plates are riveted together to form the main frame by means of rivets illustrated at 10. As shown in the dotted lines of Fig. 1, and the sectional view of Fig. 3, the plates 4, 6 and 7 are so related to each other as to form an elongated slot 12, the sides of which are formed by plates 6 and 7 and the back or right hand side, as viewed in Fig. 3, is formed by the left hand edge of the plate 4. Plates 6 and 7 are furnished with an auxiliary slot 13 which is adapted to guide the element to which the rear end of the hack saw blade is attached, and which is illustrated at 15. Element 15 is also in the form of a plate of such thickness that it can slide readily up and down between the plates 6 and 7 in the slot 12. Member 15 is equipped with a pair of lugs projecting outwardly from each side thereof, one of which is shown at 16. These lugs are adapted to cooperate with auxiliary slots 13; one of the slots 13 is cut through plate 6, and the other slot is cut through plate 7, in the same plane as the slot which is cut through plate 6, and the lugs 16 are adapted to slide up and down in these inclined slots 13 while the member 15 moves up and down in the main slot 12. It should be noted that the main slot 12 and also the auxiliary slot 13 are inclined at an angle so as the member 15 moves up and down the distance of this member from the outer end of the auxiliary or reversible frame, that is, the end which supports the outer end of the hack saw blade will vary. So, by moving member 15 up or down the tension on a saw blade inserted in the frame may be adjusted. Near the upper part of the main frame and supported between the plates 6 and 7 is an auxiliary adjusting screw supporting member 20 which is adapted to support adjusting screw 21 in a manner so that when an eccentric load is imposed on the screw 21, such as the load which is imposed by the back frame, the screw 21 will not be bent toward the right as viewed in Figs. 1 and 2. This desirable result is accomplished by extending the right hand side of the member 20 upwardly to the top of the main frame, as shown at 22. The left hand side of the screw threaded aperture adapted to receive screw 21 cannot be brought up as far as the right hand side because space must be left between the upper ends of the plates 6 and 7 to receive the rear or inner end of the auxiliary frame as will be described hereinafter. The blade supporting member 15 is moved to position and held in place by means of tensioning screw 25 which is threaded into an aperture formed by plates 6 and 7, the front or left end of plate 4 and the rear or right hand end of the member 20. Screw 25 engages the upper side of the member 15 and serves to force it downwardly so that it moves along the inclined slots 12 and 13 to produce a tension on a saw blade attached thereto and illustrated at B. Element 15 is equipped with an outwardly extending ear 26 shown in dotted lines and this ear in turn serves to support the blade-retaining pin 27 which extends through and beyond each side of the ear 26 so that the blade may be attached to either side of the ear.

The reversible back frame shown at 30 comprises a substantially horizontal portion and a right angularly disposed vertical portion, as viewed in Fig. 1. This reversible back frame is adapted to have either end thereof attached to the main frame and by so doing, various adjustments and spacing between the main frame and hack saw blade may be obtained. The back frame is constructed of two complemental members 31 and 32 which are secured together at 33. The underside of the reversible hack saw frame as viewed in Fig. 1, is equipped with a slot formed by the members 31 and 32 and shown in dotted lines at 35 (Fig. 1), and in full lines (Fig. 6). This slot is adapted to receive the upper edge of the hack saw blade when the blade is connected to the engaging pin 36. An auxiliary supporting pin 37 is attached to and projects from the member 31 and is positioned to engage the upper edge of the hack saw blade and is furnished for the purpose of supporting the protruding type of blade which is illustrated in Fig. 1. This type of blade is equipped with two holes for engaging the blade-supporting pins of the hack saw frame, but in addition, has a protruding or extending portion shown at P, which extends outwardly beyond the end of the hack saw frame and is preferably tapered or narrowed as illustrated in Fig. 1. Pin 37 will serve to transfer the stress imposed on this protruding portion from a plane through pin 36 to a plane through pin 37. The portion of the blade in the vertical plane through pin 36 is weakened by the engaging hole through the blade whereas the plane of the blade immediately below the pin 37 has no such hole and is stronger and therefore better able to withstand the sawing stresses imposed upon the outer end of such a saw blade. The inner end of this auxiliary frame, as viewed in Fig. 1, is joined to and supported upon the main frame by a pivot pin 40 which is mounted loosely in plate 7, for instance, and is adapted to pass through the auxiliary frame 30 and the plate 6, but at the same time may be readily disengaged from the plate 6 and the auxiliary frame when it is desirable to disengage the auxiliary and main frames. Near the rear end of this reversible or auxiliary frame, as viewed in Fig. 1, is illustrated an engaging pin 41 attached to either member 31 or 32 and adapted to pass through both members and protrude from each side of the back frame and is therefore adapted when the auxiliary or reversible frame is in its reversed position, as shown in Figs. 3 and 4, to engage and hold the outer end of the blade, not only when the blade is between the members 31 and 32 but also when it is disposed at one side of either member, and when the frame is in the position shown in Fig. 1, pin 41 engages in notch 42. Notch 42 is formed in the rear side of plates 6 and 7.

The innermost end of the reversible frame 30 is adapted to be engaged by the underside of the adjustable screw at 21 so that the manipulation of the screw 21 will cause it to pivot around point 40 raising or lowering the outer end thereof as may be desired. This function and operation imposes an eccentric load on the screw 21 which is compensated for by the additional support furnished by the shoulder 22 of the member 20 as explained heretofore.

The reversible back frame 30 is in what might be called the conventional position, as viewed in Fig. 1, but it may be disengaged from the main frame and placed in two other positions to have different spacings between the teeth of the saw blade and the reversible back frame.

In Fig. 3 is illustrated what we might call an intermediate position. The back frame is placed in this position by loosening the screws 21 and 25, removing the hack saw blade mounted on the pins 27 and 36, disengaging pin 40 from the reversible frame and lifting the front end of the frame upwardly as viewed in Fig. 1, about pin 41 as a pivot. When the screw 21 is unscrewed a short distance, the pin 41 may be readily disengaged from the notch 42 and the reversible frame 30 separated from the main frame 4. Then the back frame 30 is reversed in its relationship to the main frame 4 merely by pivoting it around an intermediate point on the back frame through an angle of about 180 degrees. This will bring it in the position shown in Fig. 3 where it may be pivoted to the main frame by passing pin 40 through hole 44 which passes through members 31 and 32. When the reversible frame is so positioned, it will bring the ear 45 underneath the head of the screw 21, as shown in Fig. 3, and at the same time will position safety pin 46 in notch 42. By turning the screw 21, the reversible frame may be pivoted about pin 40 and the outer end thereof raised or lowered when in this position, the pin 41 which is now positioned at the outer end of the hack saw frame serves to support the hack saw blade. This pin 41 is attached to one of the members 31 or 32 and is adapted to pass through a hole in the other member so that the members 31 and 32 may be spread apart to receive the hack saw blade therebetween. This position is illustrated in Fig. 3. There is sufficient inherent resiliency and flexibility in the members 31 and 32 so that they may be readily spread apart because, as will be remembered, they are secured together only at point 33. In this position of the auxiliary frame, there is a smaller distance between the auxiliary or reversible back frame and the blade than in the position illustrated in Fig. 1, and this is desirable for certain kinds of work where the space for operating the saw is limited and yet something of appreciable thickness must be cut. As in the position illustrated in Fig. 1, the tension on the blade is maintained by adjusting the screw 25 which engages member 15 to which the inner end of the blade is attached. Further adjustment of the distance between the blade and reversible frame may be obtained by turning the screw 21 which serves to pivot the reversible frame about pin 40. Of course, screws 25 and 21 must be manipulated with due consideration of the effect of each on the reversible frame.

Still a third position of the reversible frame relative to the main frame is illustrated in Figs. 4 and 5. In this position, there is a minimum distance between the reversible frame and saw blade. The reversible frame is attached to the main frame by passing the pivot pin 40 through hole 48 and this will bring ear 49 into engagement with the underside of the adjusting screw 21, as shown in Fig. 4. Ear 49 is equipped with a safety pin 50 which is adapted to engage in notch 42 in the same manner that pins 41 and 46 are adapted to engage in this same notch and for the same purpose which will be explained hereafter. When the reversible frame 30 is so mounted, pin 41 at the outer or left hand end thereof, as viewed in Fig. 4, is adapted to support the outer or front end of the saw blade, as explained in relation to Fig. 3, and the reversible frame is brought into close proximity with the saw blade illustrated at B'. In fact, the blade is supported between the members 31 and 32 of the frame 30, as indicated by the dotted lines representing the upper edge of the blade B' (Fig. 4). The distance between the underside of the reversible frame 30 and the teeth of the blade may be adjusted by loosening screw 25 and then adjusting screw 21 until the desired depth of cut may be obtained. This is advantageous when cutting through a bushing, for instance, where it is desired to cut through the thickness of the bushing only and then no farther.

The pins 41, 46 and 50 cooperate with the notch 42 to produce a desirable result which is best illustrated in Fig. 8, wherein part of the saw frame illustrated in Fig. 1 is shown in an inverted position. These safety pins cooperate with the notch 42 to perform this useful function. Suppose the hack saw is set up in the manner illustrated in Fig. 1, and during the process of sawing, the hack saw blade breaks. The result is that the reversible frame 30 will hang loosely on pivot 40 and perhaps when the operator of the saw lays it down in order to obtain a new blade, the pin 40 will fall out of place, so that it will no longer engage the reversible frame 30. If the saw is now turned over, the frame 30 will fall into the position shown in Fig. 8, but will not disengage itself from the main frame entirely because of the cooperation between pin 41, the notch 42 and the head of the screw 21. In the normal and operating adjustment of the saw, screw 21 is in approximately the position illustrated. Now when it is desirable to remove the reversible frame entirely from the main frame, it is only necessary to further unscrew the adjusting screw 21 and then this may be readily accomplished. The screw 21 is usually not in its retracted or "unscrewed" position when the frame and saw blade are in operative position, so in case of breakage of a blade as described above, the screw 21 will not be in a position where it will allow the reversible frame 30 to disengage itself entirely from the main frame. This is a safety feature which is advantageous where the saw may be in use on a building, perhaps, a building under construction, where it would be dangerous to have the auxiliary frame fall from the main frame and perhaps cause serious injury to anyone who might be struck by it. As illustrated in Fig. 5, pin 41 is adapted to extend out beyond members 31 and 30 a sufficient distance so that it may engage a hack saw blade disposed at the side of either of these members (illustrated in dot-dash lines at B'). This is advantageous for so-called "flush" cutting inasmuch as it disposes the hack saw blade at the side of the frame rather than centrally thereof.

Another feature of this invention which makes the use of this particular hack saw very convenient is the pair of pins shown at 60 and 61 of Fig. 1. These pins are adapted to receive and support a hack saw blade in a plane substantially at right angles to the plane of the hack saw frame taken as a whole. This is illustrated in dot-dash lines in Fig. 2.

In Figs. 9 and 10 is illustrated another embodiment of the invention showing another method of mounting the adjustable screw for the reversible back frame. In describing these figures, corresponding numerals will be used for corresponding parts illustrated in the other figures except for the addition of 100 thereto.

Upon the auxiliary plates 106 and 107 are mounted a pair of block supporting plates 70 and 71 which serve to support a screw-retaining block 72 which receives adjusting screw 121. These plates also serve to support the rear end of the reversible back frame 130 by means of a pivot pin 140 removably attached thereto. Reversible back frame 130 is equipped with a safety pin 141 adapted to fit into an overhanging groove 75 formed by the peculiar curvature of 70 and 71 as illustrated in Fig. 9, and pin 141 cooperates with this overhanging groove and functions in a similar manner as pin 41, when this pin is cooperating with notch 42. The end of reversible back frame 130 is directly under adjusting screw 121 and is adapted to be engaged by the end thereof and thus pivoted around pivot pin 140. Block 72 may be loosely mounted in the plates 70 and 71 and will be retained therein by the screw 121. This structure functions in the same manner as the structure already described in relation to the remaining figures, that is, screw 125 serves to adjust the tension on the saw blade and screw 121 serves to pivot the saw frame 130 around the pivot point 140 and thus adjust the spacing between the back frame and the saw blade.

Whereas, I have described my invention by references to specific forms thereof, it will be understood that many changes and modifications may be made without departing from the spirit of the invention.

I claim:

1. In a hack saw, a main frame, a reversible back frame adapted to engage said main frame at either end of said reversible back frame and at one end thereof to engage said main frame in a plurality of positions, and means for adjusting the relative spacing between the teeth of the saw blade and the reversible back frame in any position of said back frame on said main frame and for maintaining any desired tension on the saw blade.

2. In a hack saw, a main frame, a reversible back frame adapted to engage said main frame at either end of said reversible back frame and at one end thereof to engage said main frame in a plurality of positions, and means for adjustably pivoting said back frame about a point on said main frame when said back frame is mounted in any of the positions of said back frame on said main frame.

3. In a hack saw, a main frame, a reversible back frame adapted to pivotally engage said main frame at either end of said back frame, and means on said main frame for moving said back frame about its pivot point in order to adjust spacing between said back frame and the teeth of the saw blade comprising a screw on said main frame which cooperates with said back frame.

4. In a hack saw, a main frame, a reversible back frame adapted to pivotally engage said main frame at either end of said back frame, and means on said main frame for moving said back frame about its pivot point in order to adjust the spacing between said back frame and the teeth of the saw blade comprising a block supported on said main frame and adapted to receive a screw which cooperates with said back frame to angularly adjust said back frame around its pivotal connection with said main frame.

5. In a hack saw, a main frame, a reversible back frame adapted to pivotally engage said main frame at either end of said back frame and means on said main frame for moving said back frame about its pivot point in order to adjust the spacing between said back frame and the teeth of the saw blade comprising a block supported on said main frame and adapted to receive a screw the head of which cooperates with said back frame to angularly adjust said back frame around its pivotal connection with said main frame.

6. In a hack saw, a main frame comprising a main plate and two auxiliary plates, one disposed on each side of said main plate, a reversible back frame adapted to be pivotally engaged to said main frame between said auxiliary plates, a supporting member between said auxiliary plates and adapted to receive a screw which in turn cooperates with said back frame to angularly adjust it about its pivot point and thus produce different spacings between the teeth of a saw blade and the back frame.

7. In a hack saw, a main frame comprising a main plate and two auxiliary plates, one disposed on each side of said main plate, a reversible back frame adapted to be pivotally engaged to said main frame between said auxiliary plates, a block supported between said auxiliary plates and adapted to receive a screw, the head of which cooperates with said back frame to angularly adjust it about its pivot point and thus produce different spacings between the teeth of the saw blade and the back frame, said block serving to support the side of the screw disposed opposite to the side engaged by the back frame for a substantial distance along the thread thereof to compensate for the eccentric load imposed thereon by the back frame.

8. In a hack saw, a main frame comprising a main plate and two auxiliary plates, one disposed on each side of said main plate, a reversible back frame adapted to be pivotally engaged to said main frame between said auxiliary plates, block supporting plates mounted on said auxiliary plates near the top thereof and adapted to support a block therebetween, said block adapted to receive a screw the end of which is positioned to cooperate with said back frame to angularly adjust it about its pivot point on said main frame and thus produce different spacings between the teeth of the saw blade and the back frame.

9. In a hack saw, a handle, a hack saw frame attached thereto and adapted to support a hack saw blade comprising a portion of substantial length adapted to extend out beyond the front end of the frame and supporting means for the forward end of the blade comprising a pin adapted to pass through the blade and means attached to the frame adapted to contact with and support the upper edge of the blade adjacent to the hole for said pin.

10. In a hack saw, a hack saw frame adapted to receive and support a hack saw blade, a hack saw blade having a portion adapted to extend a substantial distance beyond the outer end of the frame, and supporting means on said frame to support the outer end of said blade, comprising a pin adapted to be received in a hole in said blade and a secondary supporting element attached to said frame and adapted to contact with the upper edge of said blade and aid in supporting it when the extended portion thereof is being utilized.

11. In a hack saw, a main frame, a reversible back frame adapted to be attached to said main frame in a plurality of positions to furnish different spacings between said back frame and a saw blade, adjusting means for moving said back frame relative to said blade when in any position on said main frame, comprising a screw with a head which is adapted to engage said back frame, and means on said main frame for supporting that side of the screw opposite to the side engaged by said back frame for a substantial distance along the threaded portion thereof.

12. In a hack saw, a main frame, a reversible back frame adapted to engage said main frame at either end of said back frame, and means on said main frame for adjustably positioning said back frame in order to adjust the spacing between said back frame and the teeth of a saw blade mounted in the hack saw.

13. In a hack saw, a main frame, a reversible back frame adapted to engage said main frame at either end of said back frame, means on said main frame for adjustably positioning said back frame in order to adjust the spacing between said back frame and the teeth of a saw blade mounted in the hack saw, and means for producing tension on the saw blade.

14. In a hack saw, a main frame, a reversible back frame adapted to pivotally engage said main frame at either end of said back frame, and means on said main frame for moving said back frame about its pivot point in order to adjust the spacing between said back frame and the teeth of a saw blade mounted in the hack saw.

15. In a hack saw, a main frame, a reversible back frame, adapted to pivotally engage said main frame at either end of said back frame, means for moving said back frame about its pivot point and means for producing a tension on a saw blade mounted in the hack saw.

In testimony whereof I have signed this specification this 9th day of June, 1930.

PETER CUNNEEN.